Jan. 6, 1970    H. W. ADAMS ET AL    3,487,888
CABIN ENGINE SOUND SUPPRESSOR
Filed Aug. 22, 1966    3 Sheets-Sheet 1
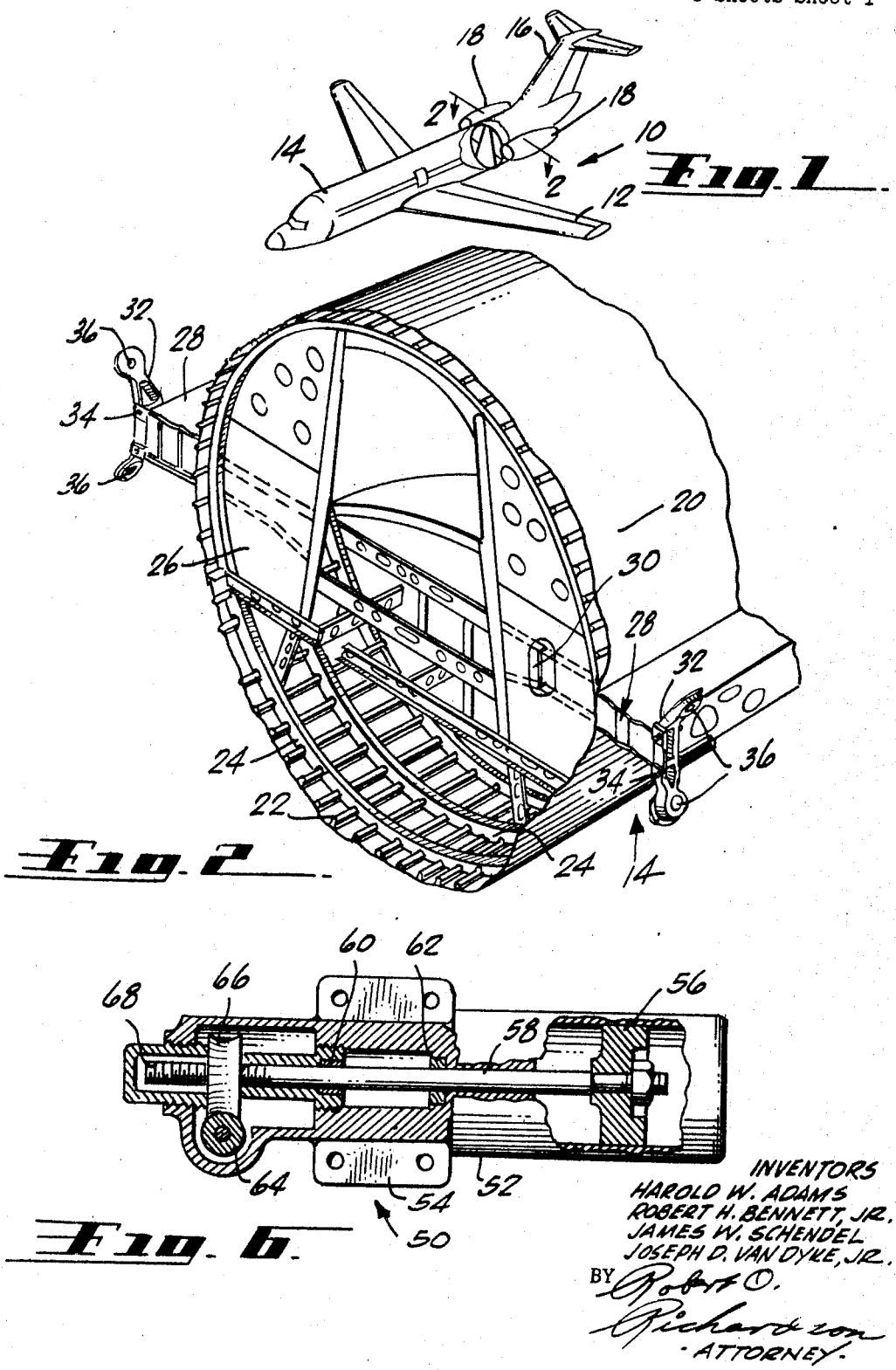
INVENTORS
HAROLD W. ADAMS
ROBERT H. BENNETT, JR.
JAMES W. SCHENDEL
JOSEPH D. VAN DYKE, JR.
BY Robert O. Richardson
ATTORNEY INVENTORS
HAROLD W. ADAMS
ROBERT H. BENNETT, JR.
JAMES W. SCHENDEL
JOSEPH O. VAN DYKE, JR.
BY Robert O. Richardson
-ATTORNEY-

United States Patent Office 3,487,888
Patented Jan. 6, 1970

3,487,888
CABIN ENGINE SOUND SUPPRESSOR
Harold W. Adams, Newport Beach, Robert H. Bennett, Jr., Los Angeles, James W. Schendel, Fountain Valley, and Joseph D. Van Dyke, Jr., Los Angeles County, Calif., assignors, by mesne assignments, to McDonnell Douglas Corporation, Santa Monica, Calif.
Filed Aug. 22, 1966, Ser. No. 573,975
Int. Cl. G10k 11/04
U.S. Cl. 181—33                    5 Claims

ABSTRACT OF THE DISCLOSURE

This invention relates to a method and apparatus for reducing cabin engine noise due to engine unbalance, which induces vibration of the cabin structure.

BACKGROUND

One type of modern day jet aircraft has jet engines affixed near the tail portion of the fuselage. These engines are not completely balanced and thus vibrate. Engine vibration in turn excites vibratory motion in the fuselage structure. The vibration of the cabin structure causes it to act much like a loudspeaker, thus generating noise in the cabin as a result of the excitation of the unbalanced engine rotors.

An obvious solution to the elimination of cabin amplified noise would appear to be simply the stiffening of the cabin structure. However, this was found to be an undesirable approach since excessive weight was required to achieve adequate stiffness. A next solution would appear to be the provision of softer engine mounts or a change in stiffness of the engine mount yoke. However, these were also found impractical since sufficient softening of the engine mounts could not be achieved while maintaining other mount requirements. A similar conclusion was reached concerning the mount yoke.

SUMMARY

It has been found that by reducing the engine induced vibration, the noise will be greatly reduced, so that the problem of noise suppression becomes one of vibration suppression. In accordance with the present invention, a dynamic vibration absorber is used to dampen out the vibrations in the structure due to the unbalance of a jet engine. This vibration absorber, or noise suppression device, is most effective when placed between the engine and the fuselage, and particularly at structural positions to which the engine is attached, since all engine vibrations must pass through these positions to reach the fuselage.

It is therefore an object of the present invention to provide apparatus for reducing cabin noise induced by engine vibration.

Another object of the provision of a tuned sound suppressor to reduce the transmission of vibration from an unbalanced engine to the fuselage of an aircraft.

Another object is the provision of a tuned sound suppressor for absorbing engine vibration wherein the suppressor generates a force approximately equal and opposite to that produced by vibrations caused by an aircraft engine unbalance.

Other objects will become more apparent as a description of the present invention proceeds, having reference to the drawings, wherein:

FIGURE 1 illustrates the type of aircraft in which cabin engine noise is most prevalent;

FIG. 2 is a sectional view taken along the line 2—2 in FIG. 1;

FIG. 6 is a schematic illustration of a variable frequency tuned damper; and

Figure 3:
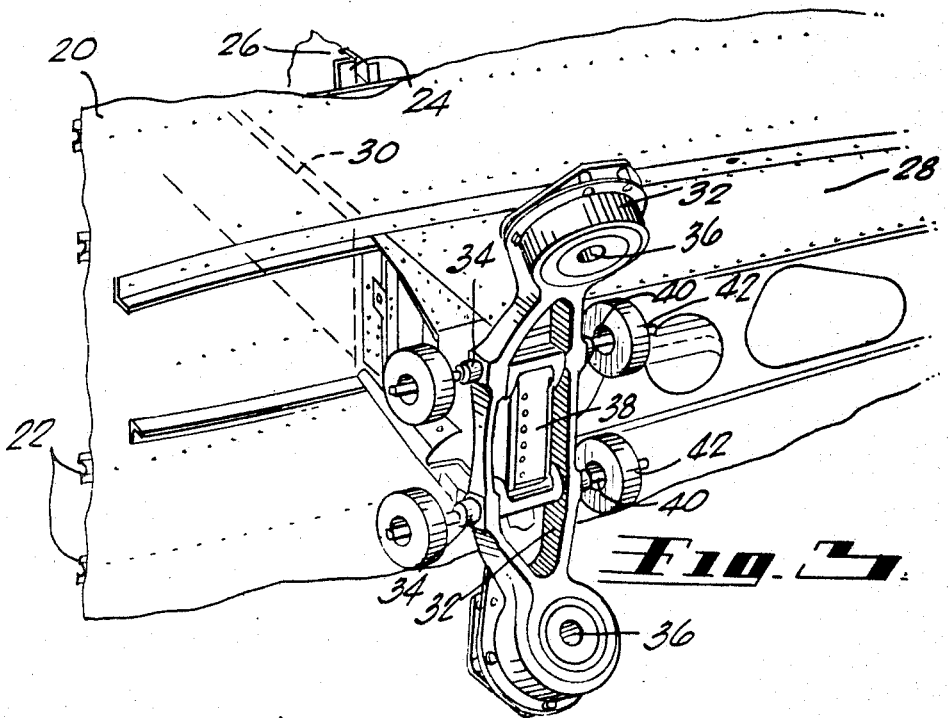
FIG. 3 is an enlarged perspective of a portion of FIG. 2 showing the application of the noise suppressors of the present invention mounted on yoke bolts.

Reference is now made to FIG. 1 wherein there is shown an airplane 10 having wings 12, fuselage 14, tail 16 and jet engines 18. These engines are mounted to the rear portion of fuselage 14 in the vicinity of the tail section 16. This represents one of several types of aircraft in which the noise problem has originated, resulting in the present invention.

In FIG. 2 the fuselage 14 is shown in section along the line 2—2 of FIG. 1. Here there is shown an outer skin surface 20 held in place by reinforcing stringers 22 and circumferential ring frames 24. Bulkhead 26 reinforces the fuselage. Extending outwardly from the fuselage 14 on both sides are engine pylons 28 which are attached through struts 30 to maintain the framework and engine pylons in integral rigid relationship. Although the engines 18 are not shown, the front part of the engines would be attached to the yokes 32 which are connected by yoke bolts 34 to the pylon 28. Another mounting on the pylon secures the rear part of the engine. Suitable apertures 36 in yoke 32 provide the appropriate mounting of the jet engines 18, shown in FIG. 1.

FIG. 3 is an enlargement of the yoke area. Here there is shown a yoke 32 having mounting holes 36 for the mounting of a jet engine, not shown. This yoke is attached to the outwardly extending spar 38 which extends through the fuselage skin 20 to strut 30. Stringers 22 extend transversely along the fuselage and lend strength, rigidity and the desired configuration to the fuselage skin 20. Yoke 32, having engine mounting openings 36, is mounted to the transversely extending spar 38 and is connected thereto by yoke bolts 34. Extending outwardly from yoke bolts 34 are stems 40 and weights 42. The weights typically are 8# to 10# in the preferred embodiment although they may be varied as needed. The engine, not shown, has two frequencies of vibration at nominal cruise power, one being 120 cycles per second resulting from the unbalance of inner rotor, and the other 180 cycles per second resulting from the outer spool. The stems or beams 40 have a length and elasticity, and weights 42 have a mass so calculated that they provide an equal and opposite force to that of the engine unbalance. The spring (or beam), length and flexibility, and the weight of the mass on the stem controls the static deflection from which the natural frequency can be calculated. It is desirable that the natural frequency of the suppression system be equal to the frequency to be dampened. For example, a 7.87 pound weight, selected by semi-empirical equations, on a beam of selected length and flexibility will produce a static deflection of .000675 inch. Using the relationship of $$FR = 3.14\sqrt{\frac{1}{Dst}}$$

where $FR$=frequency and $Dst$=static deflection, the vibration frequency of 120 c.p.s. is matched. Tuning may be done by changing the weights, or preferably by changing the length of beam 40. Two sets of weights 42 may be used to dampen the 120 cycles and the other two the 180 cycles. Thus, there is a much reduced net resulting force acting upon spar 38 and skin 20, and therefore skin 20 vibrates at a much reduced amplitude at the frequencies thus dampened.

Figure 4:
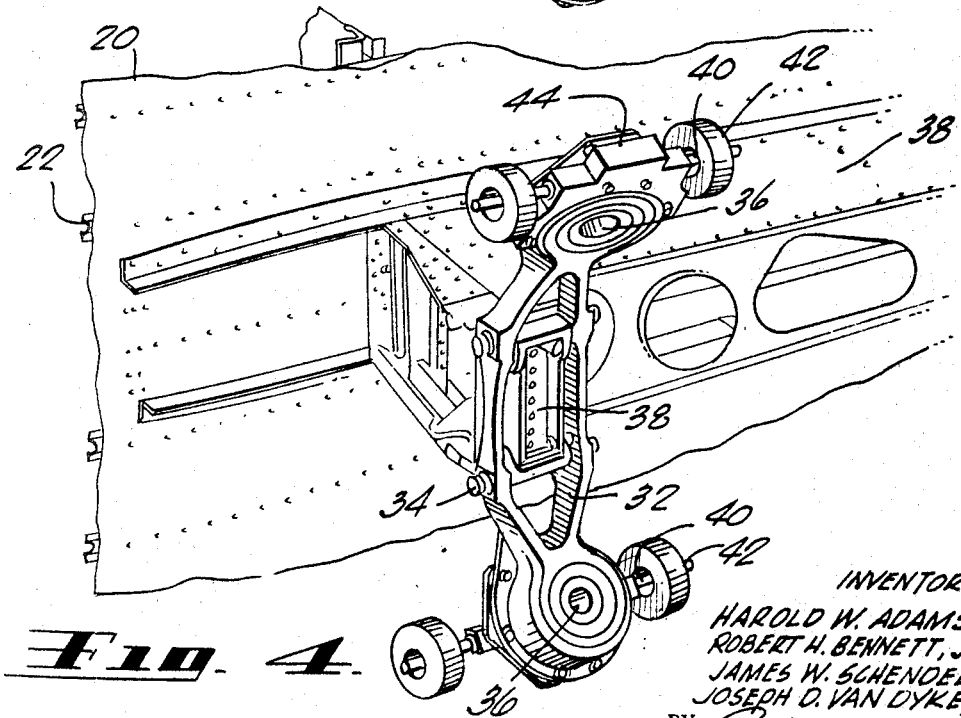
FIG. 4 is an enlarged perspective of a portion of FIG. 2 showing the sound suppressor of the present invention mounted on the yoke ends.

Referring now to the alternative embodiment shown in FIG. 4, there is shown a yoke 32, upon the ends of which has been mounted brackets 44. These brackets 44 retain beams 40 and weights 42. The combination of the weights and the length of the beams react to the jet engine unbalance resulting from the inner rotor and the outer rotor. Two of the beams and weights are approximately equal and opposite to the force of the engine unbalance from the inner rotor which sets up a vibration having a frequency of 120 cycles per second. The other pair of beams 40 and weights 42 are of such value that they are equal and opposite to the force at a frequency of vibration of 180 cycles per second resulting from the outer rotor. These vibrations to which they are tuned amplify the effective mass of the weights and act as effectively as a much larger mass. Thus an 8# dead weight may provide a reactive force of 40 to 160 lbs. depending on the preset amount of dampening in the vibration absorber system. If an unsprung weight only were used, it would have to be much heavier than the weight used as a part of a vibration absorber system.

Figure 5:
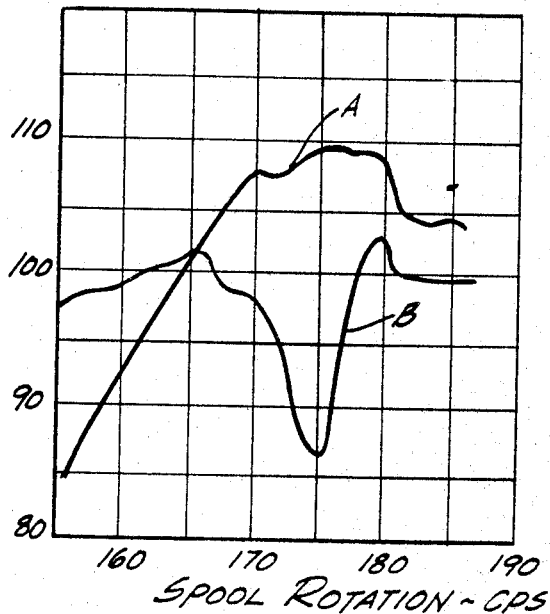
FIG. 5 is a graphical illustration showing the dampening effect of the sound absorbers upon vibrations of various frequencies.

FIG. 5 shows a graph having a sound pressure level as the ordinate and frequency of outer spool rotation as the abscissa. Line A on the graph shows that with a 175 cycles per second of spool rotation, the measured cabin noise level is 110 db. Line B is a curve plotted when using vibration absorbers tuned at 175 c.p.s. Here the measured sound pressure has dropped to about 88 db and at other adjacent frequencies it is noticeably less. It is to be noted that the inner rotor of a jet engine varies in rotation from 47 to 120 cycles and the outer spool from 110 to 190 cycles, depending upon whether the aircraft is climbing, cruising or descending. It is thus possible to select a frequency range wherein the engine unbalance vibrations, and the resultant noise, can be reduced during cruise, but remain undampened during climb. This may be desirable, and thus an additional advantage of the present invention, since passengers usually associate engine noise with power and therefore find comfort in a noisy take-off.

Reference is made to FIG. 6 wherein there is shown a variable frequency tuned damper 50. This permits the reduction of noise at all engine r.p.m.'s to which the damper is adjusted. This damper includes a housing 52 having mounting brackets 54 for attachment to an engine mounting yoke. A weight 56 is mounted on an end of spring (or beam) 58 having an adjustable length. This beam is supported at bearing points 60, 62 and is adapted for axial movement therethrough. A servo drive 64 causes rotation of actuator 66 in response to the engine tachometer, not shown. The threaded end 68 of shaft 58 is engaged with the actuator 66 which results in the axial movement of beam 58. In this manner the damper may be tuned to the engine unbalance frequency for various aircraft maneuvers, such as climbing, cruising and descending.

Figure 7:
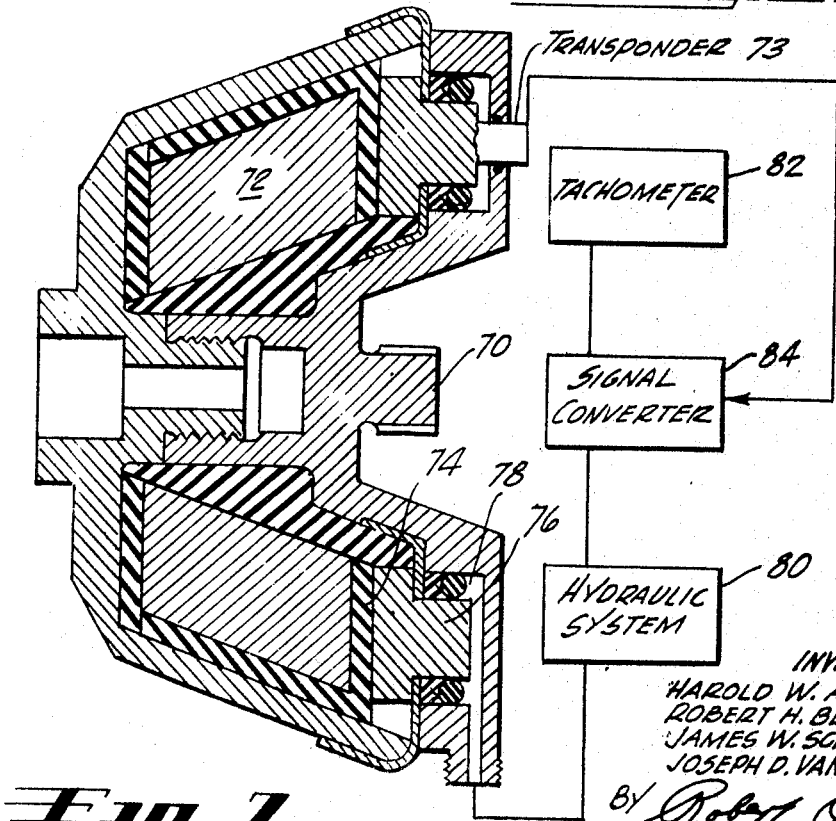
FIG. 7 is a schematic illustration of an alternate form.

The embodiments previously described, having a flexible beam to transmit vibrations to the weights, dampens vibrations from two dimensions, longitudinal, lateral, and vertical. The flexible beam is but one example of the spring-mass system of the present invention. Metallic, plastic composite or rubber springs also may be used. The required dampening may be done by friction, intermaterial friction, liquid shear or rubber. In addition to the variable length beam springs structure referred to in FIG. 6, centrifugal pendulum absorbers, variable or moving mass systems, and variable volume rubber springs may be used, with or without automatic or manual adjustment means. FIG. 7 illustrates one example of the latter wherein the frequency of vibration of the damper is changed in response to r.p.m. settings of the engine. Here a housing 70, adapted to fit on a yoke bolt, not shown, encloses an annular weighted collar 72. This collar is held in place with a resilient material, such as rubber, for example. As the housing 70 responds to vibration, the weighted collar 72 moves within the housing in a direction opposite to that of the movement of the housing. By controlling the "rigidity" or "hardness" of the resilient material 74, the natural frequency of the collar 72 can be made to correspond to the frequency of vibration of the housing 70, which in turn is controlled by the frequency of rotation of the jet engine inner rotor and/or spool, not shown. In this embodiment the effective rigidity or hardness of the resilient material may be changed by application of pressure, such as by hydraulic pressure, for example. In FIG. 7 this is done through use of piston 76 actuated by fluid in lines 78, which is part of hydraulic system 80. This system in turn may be responsive to signals indicative of the r.p.m. setting of tachometer 82. A signal convertor 84 is a means for converting tachometer setting information into a selected amount of compression of the resilient material 74. A feedback transponder 73 also may be used. It is thought that such conversion may be accomplished by one skilled in the art without further description.

Having disclosed the principles of the present invention wherein the dampening of vibration due to engine unbalance reduces cabin noise that has been generated and amplified by such vibrations, it will become apparent to those skilled in the art that there are many improvements, alterations, modifications and variations from the embodiment just described. It is therefore to be understood that the present invention is not limited to the examples just described.

What is claimed is:

1. In combination with an aircraft having a pair of jet engines affixed to pylons near the tail portion of the fuselage and wherein the unbalance of said engines cause said fuselage to vibrate and generate engine noise therein,
   yokes connected to said pylons, said engines being attached to said yokes,
   spring beams with weights thereon extending from said yokes, the length and elasticity of said beams and the mass of said weights providing a force equal and opposite to that of said engine unbalance to thus suppress transmission of engine noise and resultant vibrations in said fuselage.

2. The combination as set forth in claim 1; and
   means for adjusting the effective length of said beams to thereby adjust the natural frequency of said suppressor as desired.

3. The combination as in claim 1,
   a housing on each of said beams, said weights comprising a weighted collar;
   resilient cushioning material between said housing and collar; and
   means for varying the effective rigidity of said material to thereby adjust the natural frequency of said damper.

4. A sound suppression device as in claim 3,
   said means including means for regulating the compression of said material in accordance with the r.p.m. of the engine.

5. A sound suppressor for suppressing cabin noise resulting from engine unbalance comprising:
   a group of at least two dampers consisting of spring mounted masses tuned to resonate at the engine unbalance frequencies for which suppression is desired,
   means for attaching said dampers on major paths of sound transmission from said engine to said cabin.

(References on following page)

References Cited

UNITED STATES PATENTS

| | | |
|---|---|---|
| 989,958 | 4/1911 | Frahm. |
| 1,976,789 | 10/1934 | Lee. |
| 2,038,603 | 4/1936 | Roché _____ 248—358.1 |
| 2,214,894 | 9/1940 | Wilson. |
| 2,297,046 | 9/1942 | Bourne. |
| 2,344,735 | 3/1944 | Rockwell _____ 248—5 |
| 2,532,086 | 11/1950 | Chapman et al. |
| 2,586,043 | 2/1952 | Hodgson et al. _____ 244—75.6 |
| 2,875,731 | 3/1959 | Settles et al. |
| 2,901,239 | 8/1959 | Sethna. |
| 2,905,022 | 9/1959 | Goloff. |
| 2,916,258 | 12/1959 | Klint. |
| 3,101,937 | 8/1963 | Stearns _____ 248—358 XR |
| 3,106,985 | 10/1963 | Recupito. |
| 3,254,484 | 6/1966 | Kopper _____ 181—33 |
| 3,314,503 | 4/1967 | Neubert _____ 248—358 XR |
| 3,385,396 | 5/1968 | Morris _____ 181—65 XR |

FOREIGN PATENTS

| | | |
|---|---|---|
| 648,365 | 6/1937 | Great Britain. |
| 493,328 | 10/1938 | Great Britain. |
| 602,256 | 5/1948 | Great Britain. |
| 702,891 | 1/1954 | Great Britain. |
| 829,562 | 3/1960 | Great Britain. |
| 1,260,198 | 3/1961 | France. |
| 1,026,358 | 4/1966 | Great Britain. |

OTHER REFERENCES

S. Timoshenko, Vibration Problems in Engineering (Princeton. D. Van Nostrand Company (1955), 3rd edition, pp. 204–220.

J. P. Den Hartog, Mechanical Vibrations (New York: McGraw-Hill Book Company (1956), 4th edition pp. 87–106.

ROBERT S. WARD, Primary Examiner

U.S. Cl. X.R.

244—54; 248—5, 15, 358; 267—1

PO-1050
(5/69)

UNITED STATES PATENT OFFICE
CERTIFICATE OF CORRECTION

Patent No. 3,487,888      Dated 6 Jan 1970

Inventor(s) Harold W. Adams, Robert H. Bennett, Jr., James W. Schendel and Joseph D. Van Dyke, Jr.

It is certified that error appears in the above-identified patent and that said Letters Patent are hereby corrected as shown below:

In Column 2, line 50, after "elasticity", insert _to serve as springs. These springs_ .

SIGNED AND SEALED
MAR 2 1971

(SEAL)
Attest:

Edward M. Fletcher, Jr.
Attesting Officer

WILLIAM E. SCHUYLER, JR.
Commissioner of Patents